(12) United States Patent
Heidbreder et al.

(10) Patent No.: US 6,730,768 B2
(45) Date of Patent: May 4, 2004

(54) METHODS OF PREPARING CASTING RESINS AND COATING COMPOSITIONS USING POLYOLS DERIVED FROM HIGH OLEIC ACID CONTENT FATTY ACID MIXTURES

(75) Inventors: Andreas Heidbreder, Duesseldorf (DE); Roland Gruetzmacher, Wuelfrath (DE); Ulrich Nagorny, Hilden (DE); Alfred Westfechtel, Hilden (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 0 days.

(21) Appl. No.: 09/297,956

(22) PCT Filed: Nov. 3, 1997

(86) PCT No.: PCT/EP97/06054

§ 371 (c)(1),
(2), (4) Date: May 11, 1999

(87) PCT Pub. No.: WO98/21255

PCT Pub. Date: May 22, 1998

(65) Prior Publication Data

US 2002/0161161 A1 Oct. 31, 2002

(30) Foreign Application Priority Data

Nov. 11, 1996 (DE) .......................... 196 46 424

(51) Int. Cl.⁷ .................. C08G 18/36; C08G 18/34; C08G 18/32

(52) U.S. Cl. .............. 528/65; 528/49; 528/59; 528/74.5; 528/76; 528/80; 528/84; 528/85; 560/158; 560/179; 560/187; 560/205

(58) Field of Search ................... 528/49, 74.5, 76, 528/80, 84, 85, 65, 59; 560/179, 187, 205, 158

(56) References Cited

U.S. PATENT DOCUMENTS

| | | | |
|---|---|---|---|
| 3,931,075 A | 1/1976 | Trecker et al. | 106/266 |
| 4,010,211 A * | 3/1977 | Preston et al. | 568/582 |
| 4,021,385 A * | 5/1977 | Austin et al. | 521/174 |
| 4,124,609 A | 11/1978 | Bilyk et al. | 554/149 |
| 4,508,853 A | 4/1985 | Kluth et al. | 521/107 |
| 4,551,517 A | 11/1985 | Herold et al. | 528/60 |
| 4,742,087 A | 5/1988 | Kluth et al. | 521/107 |
| 4,826,944 A | 5/1989 | Hoefer et al. | 528/49 |
| 4,855,383 A | 8/1989 | Dammann et al. | 528/51 |
| 4,886,893 A | 12/1989 | Meffert et al. | 549/562 |
| 4,942,228 A * | 7/1990 | Gibson | 536/119 |
| 5,512,655 A | 4/1996 | Klauck et al. | 528/74.5 |

FOREIGN PATENT DOCUMENTS

| | | |
|---|---|---|
| DE | 1 645 573 | 1/1971 |
| DE | 32 46 612 | 6/1984 |
| DE | 33 47 045 | 7/1985 |
| DE | 36 20 422 | 1/1988 |
| DE | 36 30 422 | 3/1988 |
| DE | 40 24 364 | 2/1991 |
| DE | 40 41 119 | 6/1992 |
| DE | 41 22 530 | 1/1993 |
| DE | 43 08 097 | 9/1994 |
| DE | 44 46 877 | 7/1996 |
| EP | 0 152 585 | 8/1985 |
| EP | 0 259 722 | 3/1988 |
| EP | 0 260 499 | 3/1988 |
| FR | 1281243 | 12/1961 |
| FR | 1434802 | 2/1966 |

OTHER PUBLICATIONS

Swern, D. (ed.), *Bailey's Industrial Oil and Fat Products*, vol. 1, 4th Ed., Chapter 6, John Wiley & Sons, (1979), pp. 382–387.

Saunders, et al., *Polyurethanes Chemistry and Technology, Part II, Technology*; Interscience Publishers, New York, (1964), pp. 340–341.

Röbbelen, G., et al. (Eds.), *Oil Crops of the World*, Chapter 14, (1989), pp. 301–316.

Din 55 958, Dec. 1988.

* cited by examiner

*Primary Examiner*—Rabon Sergent
(74) *Attorney, Agent, or Firm*—John E. Drach; Aaron R. Ettelman

(57) ABSTRACT

A method for preparing a polyol useful in the formation of an isocyanate casting resin or coating composition is presented involving the reaction of an essentially $C_{18}$ fatty acid mixture with a monofunctional alcohol to form a fatty acid ester mixture, forming a epoxidized fatty acid ester mixture from the fatty acid ester mixture, and reacting the epoxidized mixture with an aliphatic alcohol to form a polyol. The polyol can be further reacted with an isocyanate to form a casting resin or coating composition. The fatty acid mixture contains at least 80 percent oleic acid. Polyols prepared by this method provide good color quality and improved color stability during storage when used in the production of isocyanate casting resins and coating compositions.

20 Claims, No Drawings

METHODS OF PREPARING CASTING RESINS AND COATING COMPOSITIONS USING POLYOLS DERIVED FROM HIGH OLEIC ACID CONTENT FATTY ACID MIXTURES

FIELD OF THE INVENTION

1. Background of the Invention

This invention relates to the use of special polyols for the production of isocyanate casting resins and coating compositions. The polyols to be used in accordance with the invention may be obtained by reacting epoxidized fatty acid esters of monofunctional $C_{1-8}$ alcohols with alcohols having a functionality of 2 to 10. According to the invention, the epoxidized fatty acid esters used are those of which the fatty acid component is based on fatty acid mixtures essentially containing 18 carbon atoms, the oleic acid content of the fatty acid mixtures being at least 80% by weight.

2. Discussion of Related Art

Casting resins are synthetic resins which are either liquid or which can be liquefied by moderate heating and which are cast into open molds and harden therein. Casting resins also include isocyanate casting resins. According to DIN 55958, isocyanate casting resins are synthetic resins which are based on aliphatic, cycloaliphatic or aromatic isocyanates and which still contain free terminal isocyanate groups. They may be cured under various conditions. For example, a one-component casting resin consists of a polyurethane prepolymer terminated by free or blocked isocyanate groups which cure under the effect of moisture, optionally accompanied by heating, for example to accelerate the reaction or to increase strength. A two-component casting resin is based, for example, on polyhydroxy compounds of branched polyesters or polyethers as the first component and on polyisocyanates as the second component. After the two components have been mixed, they cure either at room temperature or at a slightly elevated temperature. Two-component casting resins are used, for example, for encapsulating cable fittings.

According to the teaching of DE-A-43 08 097, isocyanate casting resins or coating compositions which are largely unaffected by moisture and chemicals can be produced by using ring opening and transesterification products of epoxidized fatty acid esters of monofunctional $C_{1-8}$ alcohols as polyols. These products can be obtained by reacting the epoxidized fatty acid esters with alcohols having a functionality of preferably 2 to 4. According to Examples 1 to 5 of DE-A-43 08 097, an epoxystearic acid methyl ester of technical quality is used as the starting material. As known to the expert, "technical quality" means that the fatty acid component on which the epoxide stearic acid methyl ester is based is a mixture of—essentially—palmitic acid, stearic acid, oleic acid and linoleic acid, the oleic acid content being about 70% by weight, based on the fatty acid mixture as a whole. One such fatty acid mixture has long been commercially available under the name of Edenor® TiO5 (manufacturer: Henkel KGaA).

Although the polyols according to DE-A-43 08 097 have a number of applicational advantages, they are generally pale yellowish liquids. The yellow color of these products does not present any problems where they are used in casting resins, finishing paints or coatings providing the polyols are reacted with aromatic diisocyanates. However, it does present problems where the polyols are reacted with colorless aliphatic diisocyanates. According to DE-A-44 46 877, the ring opening of epoxides is carried out in the presence of fluoroalkane sulfonic acids as catalyst. In this way, the color quality of the polyols thus produced is improved.

DE-A-40 24 364 describes a process for the production of plastic comonomers and plastics from fats and oils using unsaturated fatty acids, in which crude unsaturated fats and oils are oxidized with performic acid or peracetic acid to form epoxy or hydroxy compounds and, for the production of plastics, are subsequently reacted with difunctional or multifunctional compounds capable of reacting with epoxy and hydroxy groups to form polymers.

DESCRIPTION OF THE INVENTION

The problem addressed by the present invention was to provide polyols which, when used in the production of isocyanate casting resins and coating compositions, would basically show good color quality and, in addition, would show improved color stability during the storage of the corresponding isocyanate casting resins and coating compositions.

It has now surprisingly been found that the problem stated above can be solved by polyols obtainable by reacting epoxidized fatty acid esters of monofunctional $C_{1-8}$ alcohols with aliphatic alcohols having a functionality of 2 to 10, the fatty acid component of the epoxidized fatty acid esters being based on fatty acid mixtures essentially containing 18 carbon atoms and the oleic acid content of these fatty acid mixtures being at least 80% by weight, based on the fatty acid mixture as a whole.

The production of the polyols according to the invention is illustrated by reaction scheme 1 below. In this scheme, the substituent R is a $C_{1-8}$ alkyl group. Accordingly, the upper formula in scheme 1 represents an oleic acid alkyl ester. It contains a C=C double bond in the 9,10 position of the fatty chain. This double bond is accessible to epoxidation, in which case the associated epoxidized oleic acid alkyl ester is formed, as illustrated in the second formula of scheme 1. This epoxidized oleic acid alkyl ester is then reacted with aliphatic alcohols having a functionality of 2 to 10 to form a corresponding polyol.

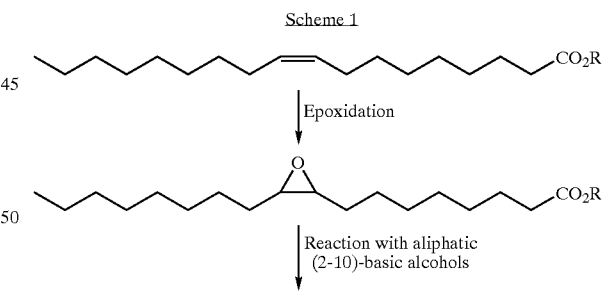

Now, if the special fatty alkyl group, i.e. the fatty component of the fatty acid ester, in the first formula of scheme 1 which—in this particular embodiment—stands for an oleic acid alkyl ester, is replaced by a fatty acid mixture essentially containing 18 carbon atoms, the oleic acid content of this fatty acid mixture being at least 80% by weight, based on the fatty acid mixture as a whole, and if this transformation is correspondingly applied to the second formula of scheme 1 remembering that, on this occasion, it is not of course a fatty alkyl group, but rather an epoxyfatty alkyl group which is to be replaced, a general scheme describing the production of the polyols according to the invention would be obtained.

Accordingly, the present invention relates to the use of polyols obtainable by reacting epoxidized fatty acid esters of monohydric $C_{1-8}$ alcohols with aliphatic alcohols having a functionality of 2 to 10, the fatty acid component of the epoxidized fatty acid esters being based on fatty acid mixtures essentially containing 18 carbon atoms and the oleic acid content of these fatty acid mixtures, based on the fatty acid mixture as a whole, being at least 80% by weight, for the production of isocyanate casting resins and coating compositions.

According to the invention, the polyols are produced, as mentioned above, by reacting epoxidized fatty acid esters with aliphatic alcohols having a functionality of 2 to 10. This reaction is carried out in accordance with the teaching of DE-A43 08 097 by ring opening and transesterification. Preference is attributed here to the ring opening and transesterification products with alcohols having a functionality of 2 to 7, more particularly to the reaction products with ethylene glycol, propylene glycol, oligomeric ethylene glycols, oligomeric propylene glycols, to the reaction products with glycerol, diglycerol, polyglycerol, trimethylol propane, di-trimethylol propane and/or pentaerythritol. Products such as these can be produced by known methods, the transesterification being carried out during or after the ring opening step by removing the lower alcohol from the reaction equilibrium. Ring opening and transesterification products in which the mole ratio of epoxidized fatty acid ester to the alcohol used for the reaction is 1:1 to 1:10 are preferred. Here, too, 1:1 or 1:2 adducts can be produced analogously to the opening products of epoxidized fatty alcohols.

In one preferred embodiment of the present invention, fatty acid mixtures of sunflower oil from high oleic plants are used as the fatty acid component on which the epoxidized fatty acid esters are based. The fatty acid composition of sunflower oil from high oleic plants is as follows: 80 to 95% by weight oleic acid, 2 to 12% linolenic acid, 1 to 5% stearic acid, 2 to 5% palmitic acid. All these percentages represent percentages by weight, based on the fatty acid mixture as a whole. According to the invention, particularly preferred epoxidized fatty acid esters are those of which the fatty acid component is based on fatty acid mixtures from sunflower oil from high oleic plants and in which the oleic acid content of these fatty acid mixtures is at least 85% by weight. One such oil is commercially available, for example, under the name of "Trisun®" from Special Vegetable Oils (SVO), Eastlake, Ohio, USA.

In another embodiment of the present invention, a so-called "high oleic, low stearic" sunflower oil (hereinafter referred in short as HOLS sunflower oil) is used as the basis of the epoxidized fatty acid esters. The fatty acid composition of HOLS sunflower oil is as follows: 85 to 95% oleic acid, 2 to 8% linoleic acid, 0.5 to 2.5% stearic acid and 2 to 5% palmitic acid. Here, too, all percentages represent percentages by weight, based on the fatty acid mixture as a whole.

The present invention also relates to isocyanate casting resins and coating compositions obtainable by reacting the described polyols according to the invention with isocyanates having a functionality of 2 to 4.

Both aromatic and aliphatic monocyclic and polycyclic isocyanate compounds having the functionality mentioned are suitable for the production of the isocyanate casting resins and coating compositions according to the invention. Thus, in a first embodiment, tolylene diisocyanate or diphenyl methane diisocyanate may be used as the aromatic isocyanate. Technical diphenyl methane diisocyanate containing diisocyanates of higher functionality and having an isocyanate group functionality of greater than 2 is particularly suitable. Another suitable aromatic diisocyanate is xylylene diisocyanate. In addition, a number of aliphatic isocyanates having a functionality of 2 or more may be used. Examples include isophorone diisocyanate, tris-(6-isocyanatohexyl)-isocyanate and dicyclohexyl methane diisocyanate as cyclic aliphatic diisocyanates. Other examples are aliphatic straight-chain diisocyanates obtained by phosgenation of diamines, for example tetramethylene diisocyanate or hexamethylene diisocyanate.

In a particularly preferred embodiment of the present invention, hexamethylene diisocyanate is used as isocyanate component for the production of the casting resins or coating compositions.

Besides the polyfunctional isocyanate compounds, prepolymers may also be used in principle as isocyanate component in the two-component casting resins according to the invention. Prepolymers in this context are understood to be the adducts of polyfunctional isocyanates with polyfunctional alcohols, for example the reaction products of one of the above-mentioned aromatic or aliphatic diisocyanates with ethylene glycol, propylene glycol, glycerol, trimethylol propane or pentaerythritol. Reaction products of diisocyanates with polyether polyols, for example polyether polyols based on polyethylene oxide or polypropylene oxide, may also be used as prepolymers.

The two-component casting resins and coating compositions may additionally contain various auxiliaries which are preferably added to and mixed with the polyol. Examples of such auxiliaries include fillers. Suitable fillers are inorganic compounds that are not reactive to isocyanates, for example chalk and gypsum, precipitated silica, zeolites, bentonites, ground minerals and other inorganic fillers known to the expert. Organic fillers, especially chopped strands and the like, may also be used. Fillers which provide the casting resins with thixotropic properties are preferred.

The two-component casting resins or coating compositions according to the invention may additionally contain accelerators. Suitable accelerators are, for example, tertiary bases, such as bis-(N,N-dimethylamino)-diethyl ether, dimethyaminocyclohexane, N,N-dimethylbenzyl amine, N-methyl morpholine and the reaction products of dialkyl-(β-hydroxyethyl)-amine with monoisocyanates and esterification products of dialkyl-(β-hydroxyethyl)-amine and dicarboxylic acids. Another accelerator is 1,4-diaminobicyclo-(2.2.2)-octane. Non-basic substances may also be used as accelerators. Examples include metal compounds, for example iron pentacarbonyl, nickel tetracarbonyl, iron acetyl acetonate and tin(II)-(2-ethylhexoate), dibutyl tin dilaurate and molybdenum glycolate.

Besides the compounds mentioned above, the casting resins and coating compositions may contain other auxiliaries, including solvents. Suitable solvents are those which do not react with isocyanate groups, for example halogenated hydrocarbons, esters, ketones, aromatic hydrocarbons and the like. Plasticizers, flameproofing agents, retarders, dyes and antiagers of the type known in the corresponding casting resins may also be incorporated.

Up to 80% of the polyols according to the invention may be replaced by other polyols. However, the polyols to be used in accordance with the invention are preferably used unmixed.

The following Examples are intended to illustrate the invention without limiting it in any way.

EXAMPLES

Raw Materials Used

Edenor MeTiO5: Fatty acid methyl ester mixture based on a fatty acid mixture with the following composition: 5% palmitic acid, 1% stearic acid, 67% oleic acid, 11% linolenic acid (a product of Henkel KGaA).

Edenor MeTiO5 is a raw material for producing a polyol for comparison purposes.

Priolube 1400: Fatty acid methyl ester mixture based on a fatty acid mixture with the following composition: 5% palmitic acid, 2% stearic acid, 67% oleic acid, 9% linolenic acid (a product of Unichema).

Priolube 1400 is a raw material for producing a polyol for comparison purposes.

NSf-Me-Ester: Fatty acid methyl ester mixture based on a fatty acid mixture (ex sunflower oil from high oleic plants) with the following composition: 5% palmitic acid, 5% stearic acid, 85% oleic acid, 4% linoleic acid.

NSf-Me-Ester is a raw material for producing a polyol according to the invention.

Production of the Polyols

The fatty acid methyl ester mixtures mentioned above under the heading "raw materials used" were conventionally epoxidized at the C=C double bonds in the presence of acidic catalysts. The epoxides were then reacted with trimethylol propane. The ratio of fatty acid methyl ester mixture to trimethylol propane was 1:0.8 (based on epoxide value and OH value). An overview of the products obtained in these reactions is given in Table I:

TABLE I

| Raw material | Epoxide | Polyol |
|---|---|---|
| MeTiO5 | EpO = 4.76<br>SV = 185<br>IV = 1.6<br>AV = 0.6 | OHV = 313<br>Av = 0.8<br>COV = 4.1<br>Color: 3 yellow<br>0.2 red<br>0.1 neutral |
| NSf-Me-Ester | EpO = 4.48<br>SV = 188<br>IV = 2.2<br>AV = 0.6 | OHV = 294<br>Av = 0.6<br>COV = 5.2<br>Color: 3 yellow<br>0.2 red<br>0.1 neutral |
| Priolube 1400 | EpO = 4.45<br>SV = 190<br>IV = 5.1<br>AV = 0.9 | OHV = 315<br>Av = 0.9<br>COV = 5.6<br>Color: 3 yellow<br>0.2 red<br>0.1 neutral |

In Table I:
EpO = epoxide value
SV = saponification value
IV = iodine value
AV = acid value
OHV = OH value
COV = carbonyl value
Color = Lovibond color value (5.25 inch cell)

Performance Tests

Casting compounds containing 1,6-hexamethylene diisocyanate (HDI) and 1,6-hexamethylene diisocyanate trimer (HDT) were prepared in order to test the properties of the polyols described above. The polyols containing HDI and HDT were used in a ratio of 1:1 (based on OH value and NCO value). These products were stored for several weeks at 80° C. The yellowing of the compounds was visually evaluated at the beginning and after one and two weeks on the basis of a scale in which the value 0 stands for "colorless" and the value 10 for "serious yellowing". Particulars can be found in Tables II and III below.

TABLE II

Casting compounds based on polyol/HDI (stored at 80° C.)

| | Color | | |
|---|---|---|---|
| Polyol based on | At the beginning | After 1 week | After 2 weeks |
| MeTiO5 | 2 | 3 | 6 |
| Priolube 1400 | 3 | 5 | 9 |
| NSf-Me-Ester | 1 | 3 | 5 |

* Color scale: 0 = colorless, 10 = serious yellowing

TABLE III

Casting compounds based on polyol/HDT (stored at 80° C.)

| | Color | | |
|---|---|---|---|
| Polyol based on | At the beginning | After 1 week | After 2 weeks |
| MeTiO5 | 4 | 6 | 8 |
| Priolube 1400 | 5 | 9 | 10 |
| NSf-Me-Ester | 3 | 5 | 7 |

* Color scale: 0 = colorless, 10 = serious yellowing

Tables II and III show that the casting resins based on the polyol according to the invention have distinctly better color values than the corresponding products based on the comparison polyols.

What is claimed is:

1. A method of preparing an isocyanate casting resin/coating composition, said method comprising:
    (a) providing a polyol ester prepared by reacting a mixture of epoxidized fatty acid esters of monofunctional $C_{1-8}$ alcohols with an aliphatic alcohol having a functionality of from 2 to 10, wherein the mixture of epoxidized fatty acid esters has a fatty acid component, the fatty acid component comprising oleic acid in an amount of at least 80 percent by weight based on the fatty acid component;
    (b) providing an isocyanate having a functionality of from 2 to 4; and
    (c) reacting the polyol ester and the isocyanate.

2. The method according to claim 1, wherein the mixture is derived from sunflower oil.

3. The method according to claim 1, wherein the mixture is derived from high oleic sunflower plants.

4. The method according to claim 1, wherein the fatty acid component comprises oleic acid in an amount of at least 85 percent by weight based on the fatty acid component.

5. The method according to claim 1, wherein the fatty acid component comprises oleic acid in an amount of from 80 to 95 percent by weight based on the fatty acid component.

6. The method according to claim 2, wherein the fatty acid component comprises oleic acid in an amount of from 80 to 95 percent by weight based on the fatty acid component.

7. The method according to claim 1, wherein the fatty acid component comprises oleic acid in an amount of from 85 to 95 percent by weight and stearic acid in an amount of front 0.5 to 2.5 percent by weight based on the fatty acid component.

8. The method according to claim 2, wherein the fatty acid component comprises oleic acid in an amount of from 85 to 95 percent by weight and stearic acid in an amount of from 0.5 to 2.5 percent by weight based on the fatty acid component.

9. The method according to claim 1, wherein the aliphatic alcohol has a functionality of from 2 to 7.

10. The method according to claim 1, wherein the aliphatic alcohol comprises a member selected from the group consisting of ethylene glycol, propylene glycol, glycerol, trimethylol propane, pentaerythritol and mixtures thereof.

11. The method according to claim 1, wherein the mixture of epoxidized fatty acid esters and the aliphatic alcohol are reacted in a mole ratio of from 1:1 to 1:10.

12. The method according to claim 1, wherein the isocyanate comprises hexamethylene diisocyanate.

13. The method according to claim 1, wherein the polyol ester is reacted with an isocyanate prepolymer.

14. The method according to claim 13, wherein the isocyanate prepolymer comprises an adduct of polyfunctional isocyanate with a polyfunctional alcohol.

15. An isocyanate composition prepared by the method according to claim 1.

16. An isocyanate composition prepared by the method according to claim 2.

17. An isocyanate composition prepared by the method according to claim 4.

18. An isocyanate composition prepared by the method according to claim 7.

19. An isocyanate composition prepared by the method according to claim 8.

20. An isocyanate composition prepared by the method according to claim 12.

* * * * *